(12) United States Patent
Cho et al.

(10) Patent No.: US 12,475,124 B1
(45) Date of Patent: Nov. 18, 2025

(54) DICTIONARY SHARING FOR EFFICIENT JOIN OPERATION IN COLUMN STORE

(71) Applicant: SAP SE, Walldorf (DE)

(72) Inventors: Young Goo Cho, Seoul (KR); Jaehyok Chong, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/666,418

(22) Filed: May 16, 2024

(51) Int. Cl.
*G06F 16/2453* (2019.01)
*G06F 16/22* (2019.01)
*G06F 16/2455* (2019.01)

(52) U.S. Cl.
CPC ...... *G06F 16/24542* (2019.01); *G06F 16/221* (2019.01); *G06F 16/2237* (2019.01); *G06F 16/2255* (2019.01); *G06F 16/2456* (2019.01)

(58) Field of Classification Search
CPC ............. G06F 16/24542; G06F 16/221; G06F 16/2237; G06F 16/2255; G06F 16/2456; G06F 16/24544; G06F 16/2282; G06F 16/24537; G06F 16/24539
USPC ......................................................... 707/714
See application file for complete search history.

(56) References Cited

U.S. PATENT DOCUMENTS

| | | | |
|---|---|---|---|
| 2013/0013585 A1* | 1/2013 | Graefe ................ | G06F 16/2456 707/E17.054 |
| 2014/0279853 A1* | 9/2014 | Grondin ................ | G06F 16/278 707/722 |
| 2017/0255675 A1* | 9/2017 | Chavan ............. | G06F 16/24562 |
| 2018/0081939 A1* | 3/2018 | Hopeman ........... | G06F 16/2282 |
| 2018/0089261 A1* | 3/2018 | Li ........................ | G06F 16/2453 |
| 2018/0113909 A1* | 4/2018 | Ramesh .............. | G06F 16/9014 |
| 2018/0137163 A1* | 5/2018 | Bensberg ............. | G06F 16/2456 |
| 2018/0189331 A1* | 7/2018 | Fabijancic .......... | G06F 16/2282 |
| 2018/0210922 A1* | 7/2018 | Schulze .............. | G06F 16/2453 |
| 2019/0095486 A1* | 3/2019 | Hopeman, IV ..... | G06F 16/2456 |
| 2022/0092069 A1* | 3/2022 | Hartsing ........... | G06F 16/24544 |

OTHER PUBLICATIONS

SAS Help Center, "Influencing the Join Algorithm," https://documentation.sas.com/doc/en/etlug/4.905/n14ddbstugoeoon122kuq0wu32le.htm, 2 pages (accessed May 6, 2024).

(Continued)

*Primary Examiner* — Evan Aspinwall
(74) *Attorney, Agent, or Firm* — Klarquist Sparkman, LLP

(57) ABSTRACT

A computer implemented method can receive a first data table having a first column and a second data table having a second column, and obtain a dictionary shared by the first and second columns. The dictionary maps a plurality of unique data values to corresponding unique value identifiers. The method can generate a first data vector for the first column and a second data vector for the second column. The first data vector includes first value identifiers corresponding to data values stored in the first column, and the second data vector includes second value identifiers corresponding to data values stored in the second column. The method can join the first and second data tables based on the first and second data vectors. The joining generates one or more matching records between the first and second data tables. Related systems and software for implementing the method are also disclosed.

16 Claims, 10 Drawing Sheets

(56) References Cited

OTHER PUBLICATIONS

GeeksforGeeks, "Inverted Index," https://www.geeksforgeeks.org/inverted-index/, 12 pages (accessed May 6, 2024).
SAP HANA performance Guide for Developers, "Cyclic Joins," https://help.sap.com/docs/SAP_HANA_PLATFORM/9de0171a6027400bb3b9bee385222eff?locale=en-US&state=PRODUCTION&version=2.0.07, 2 pages (accessed May 6, 2024).

* cited by examiner

DICTIONARY SHARING FOR EFFICIENT JOIN OPERATION IN COLUMN STORE

BACKGROUND

In column store databases (where data is stored by attributes in columns), join operations are used to merge rows from two or more tables based on a related column. When it comes to query optimization, the efficiency of join operations is important. Two common join algorithms are index join and hash join. An index join uses database indexes to find matching rows in the tables, which can significantly speed up the join operation when the indexes are properly designed. On the other hand, a hash join creates a hash table of the smaller table and then scans the larger table, matching rows based on the hashed values. This can be highly efficient for larger datasets. Query optimizers use these and other factors to determine the most efficient execution plan for a query. Optimizing these join operations can greatly enhance database performance and data retrieval speed. Thus, room for improvement exists in enhancing the efficiency of join operation in column store.

DETAILED DESCRIPTION

Overview of Table Join and Dictionary Encoding

In column store relational databases, where data is stored by attributes in columns, join operations are a fundamental process. These operations are used to merge rows from two or more tables based on a related column. This related column is often referred to as the "join key." The join operation allows for the retrieval of related data stored in different tables, which is a common requirement in database queries.

When it comes to query optimization, the efficiency of join operations is very important because the complexity of join operations can significantly impact the overall performance of database queries. Depending on the size of the tables and the nature of the join key, a join operation can potentially involve comparing every row in one table with every row in another. This can lead to a high computational cost, especially for large tables.

Two common join algorithms that are often used to improve the efficiency of join operations are index join and hash join. An index join uses database indexes to find matching rows in the tables. This can significantly speed up the join operation when the indexes are properly designed. On the other hand, a hash join creates a hash table of the smaller table and then scans the larger table, matching rows based on the hashed values. This can be highly efficient for larger datasets, as it avoids the need for a nested loop that compares every pair of rows. Typically, a query optimizer can determine, based on a number of criteria, which join algorithm is used for query execution.

Both hash join and index join can be complicated if dictionary encoding is used to represent data values stored in table columns.

Dictionary encoding is a common technique used in databases to optimize data storage and retrieval. In column store databases, dictionary encoding involves replacing the actual data values in a column with compact integer identifiers. Specifically, for a selected column, a dictionary is created where each unique data value in the column is assigned a unique integer identifier. This dictionary serves as a mapping between the actual data values and their corresponding identifiers. The actual data values in the column are then replaced with their corresponding identifiers from the dictionary. One primary benefit of dictionary encoding is space efficiency. As integer identifiers typically require less space than the actual data values, especially for string data, dictionary encoding can significantly reduce the storage space required for a column. In some circumstances, dictionary encoding may also enhance query performance. For example, some database operations can be performed more efficiently on integer identifiers than on actual data values.

Figure 1:
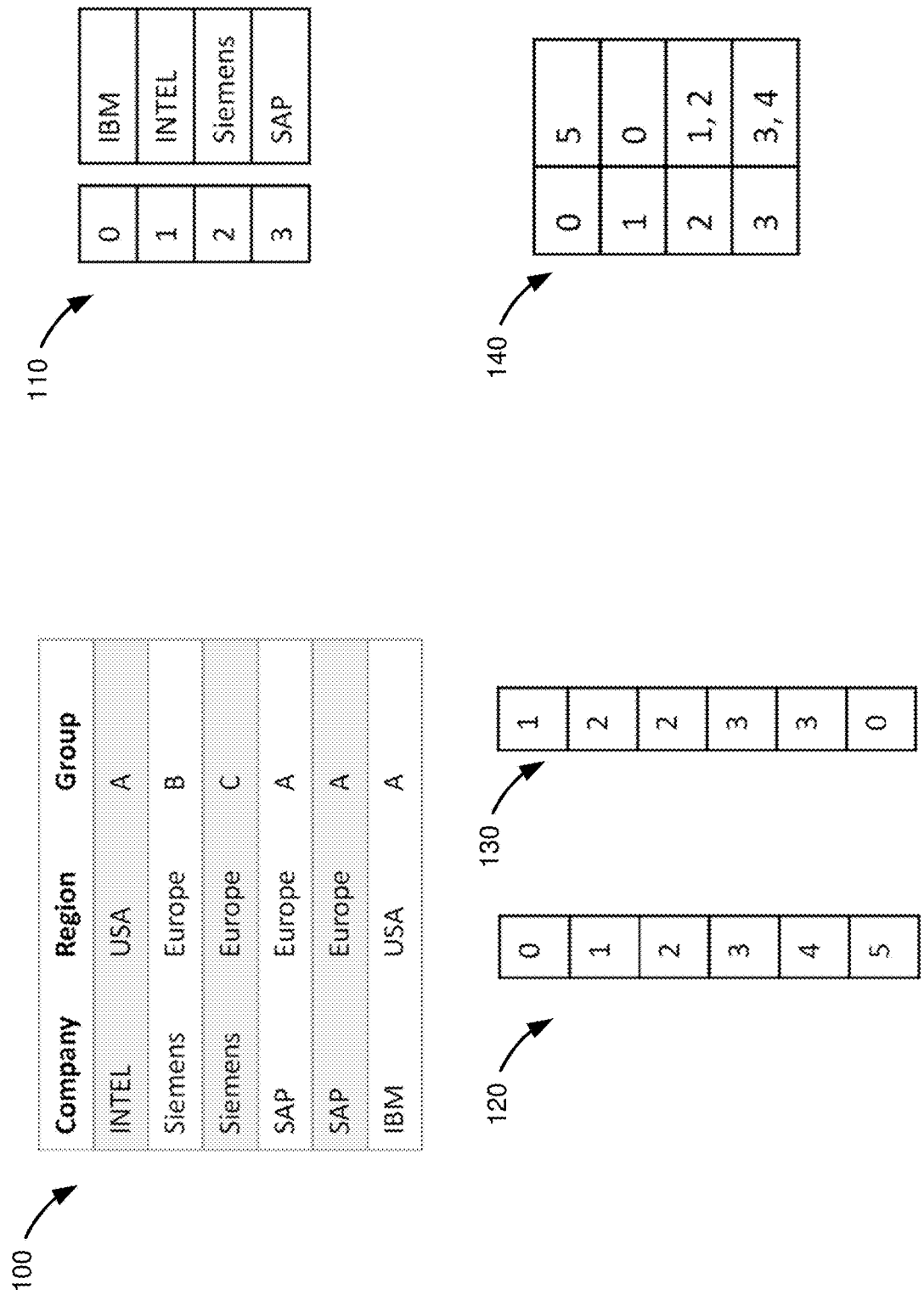
FIG. 1 illustrates dictionary encoding of a column of an example database table and an inverted index generated for the column.

As an example, FIG. 1 shows a data table 100 including three columns. A dictionary 110 is created for unique data values contained in the "Company" column of the data table 100. For example, the unique data values "IBM," "INTEL," "Siemens," and "SAP" are respectively mapped to unique value identifiers 0, 1, 2, and 3. Based on the dictionary 110, the "Company" column of the data table 100 can be encoded to a data vector 130, which include value identifiers (e.g., 1, 2, 2, 3, 3, 0) corresponding to respective data values in the "Company" column. The data vector 130 has a corresponding record vector 120, which includes record identifiers or row numbers (e.g., 0, 1, 2, 3, 4, 5) for corresponding value identifiers included in the data vector 130. An index can be created by the combination of record vector 120 and the data vector 130. Thus, using the index, for each record identifier or row number, a corresponding value index representing a unique data value in the "Company" column can be obtained. An inverse index 140 can be created by inversing the mapping direction of the index, that is, for each value index, one or more record identifiers or row numbers can be quickly obtained. For example, the value identifier 0 has one record identifier 5, the vid 2 has two record identifiers 1 and 2, etc.

In conventional database systems, dictionary encoding may complicate join operations if two related columns of two data tables have incompatible dictionaries. This is because the integer identifiers assigned to the same data values in the two columns may not match if the dictionaries are not compatible. For instance, in one table, the value "IBM" might be assigned the identifier 0, while in another table, the same value "IBM" might be assigned a different identifier, say 3. To handle such discrepancies, conventional database systems typically require additional data processing steps to handle these mismatched identifiers, as explained further below. Inherently, these additional data processing steps can negatively impact efficiency of join operations.

The technology described herein provides a more efficient join operation in conjunction with dictionary encoding. As described more fully below, using a shared dictionary determined by a key constraint, improved efficiency in both index join and hash join operations can be achieved compared to conventional approaches.

Example Database System Supporting Efficient Join Operation

Figure 2:
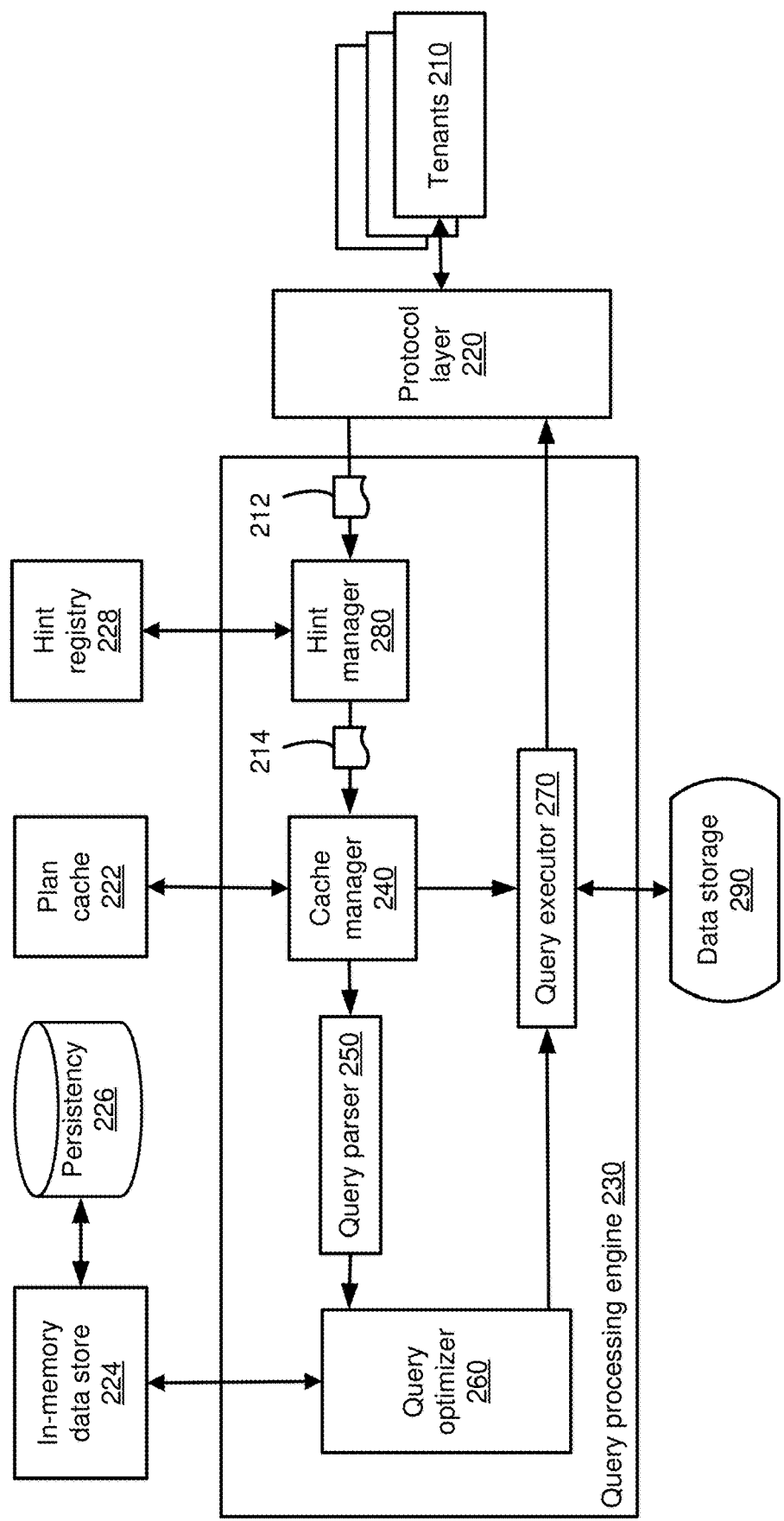
FIG. 2 is an overall block diagram of an example database management system supporting efficient join operations.

FIG. 2 shows an overall block diagram of an example database management system 200 supporting efficient join operation. The database management system 200 can be configured to support multi-tenancy, which is a feature in many types of cloud computing services. In a multi-tenancy environment, one instance of a software application and supporting infrastructure (e.g., virtual machines, memories, etc.) can serve multiple user groups, or tenants. Thus, multiple tenants can share the same application and other computing resources running on the same operating system, on the same hardware, with the same data-storage mechanism(s). Even though resources are shared, each tenant can appear to have its own instance of the application. Importantly, the underlying data of the tenants can be kept separate and secure.

As shown, the database management system 200 includes a query processing engine 230 and a protocol layer 220 which serves as an interface between one or more tenants 210 and the query processing engine 230. For example, the protocol layer 220 can implement a server name indication protocol by which the tenants 210 can connect to the query processing engine 230. Each tenant 210 represents a group of users who can access a tenant-specific database (e.g., data storage 290) managed by the database management system 200.

In some examples, the query processing engine 230 can include a hint manager 280, a cache manager 240, a query parser 250, a query optimizer 260, and a query executor 270.

An incoming query 212 sent from a tenant 210 can be processed by the hint manager 280 to output a query 214, which can be the same as or different from the incoming query 212. The hint manager 280 maintains a hint registry 228. The hint registry 228 can store hint records, each of which includes a hint target and a hint (also referred to as a "hint string") paired with the hint target. In some examples, a hint target can be a query statement, which can also be referred to as a "target query statement." In this scenario, the hint in the hint record is paired with the target query statement. In some examples, a hint target can be one or more database objects, which can also be referred to as "target objects." In this scenario, the hint in the hint record is paired with the one or more target objects.

The hint manager 280 can search the hint registry 228 to identify if the incoming query 212 has a matching hint record. If a match is found, the hint specified in the hint record can be added to the incoming query 212, modifying it into a new query. This modified query is then propagated downstream for further processing. If no matching hint record is found, the incoming query 212 is not modified and is passed directly for downstream query processing.

For hint records containing hint targets that are target query statements, the hint manager 280 can use string comparison to determine if the incoming query 212 matches any of the target query statements. The target query statements can be patterned or non-patterned. As described herein, a patterned query statement includes a wildcard expression, whereas a non-patterned query statement is absent of a wildcard. A wildcard expression can be a special character or sequence of characters that matches any character or set of characters in a string. This wildcard can take various forms, including matching any literals, matching literals within a set of constants, matching literals within a range, or matching literals that start with a specific string or are of a specific datatype.

For hint records containing hint targets that are target objects, the hint manager 280 can parse the incoming query 212 to determine if the target objects appear in the incoming query 212. For example, a hint paired to a target object can be appended to any incoming queries in which the target object is specified. As described herein, the target objects can include database tables, database views, table functions, synonyms, sequences, etc.

The cache manager 240 can access a plan cache 222, which represents a fast-access memory space configured to store previously compiled query plans. The cache manager 240 receives the query 214 (which can be the incoming query 212 added with a hint or the unmodified incoming query 212) sent from the hint manager 280. The cache manager 240 can evaluate the received query 214 to determine if the query 214 has a corresponding (compiled) query plan stored in the plan cache 222.

If the cache manager 240 finds no query plan in the plan cache 222 that corresponds to the query 214, the query 214 can be analyzed by the query parser 250, which can check if the query 214 contains syntactic and/or semantic errors. After verifying that the query 214 is a valid transactional SQL statement (e.g., SELECT, INSERT, UPDATE, DELETE, MERGE, etc.), the query parser 250 can generate a logical tree (also referred to as a "query tree") in which the query 214 can be executed.

As described herein, a query tree is a logical representation of the query statement. It includes a plurality of nodes and edges linking the nodes. The nodes can include leaf nodes and one or more internal nodes. A leaf node has no child nodes. In contrast, an internal node has one or more child nodes. The root of the query tree, or root node, can be regarded as a special internal node. The query tree denotes a relational algebra expression. Specifically, tables involved in the query can be represented as leaf nodes. The relational algebra operations can be represented as internal nodes. The root node represents the query as a whole and can also be referred to as a "project" node. When a query plan is executed, an internal node can be executed when its operand tables are available. The internal node can then be replaced by a result table generated by the operation represented by the internal node. This process can continue for all internal nodes until the root node is executed and replaced by the result table, which can be returned as query results.

The logical tree can be used by the query optimizer 260 to generate a corresponding query plan, which determines how the query 214 will be executed. The query optimizer 260 is configured to select a query plan (among a plurality of query plans that are generated based on enumeration of the logical tree) that yields optimal performance. Performance of a query plan can be described in terms of cost, which can be time (e.g., time required to execute the query plan) and/or burden on computing resources (e.g., processing power and/or memory expended to execute the query plan). Cost-based query optimization chooses the query plan with the lowest cost among all candidate query plans. In practice, although the terms "optimal" and "optimize" are used, the actual best query plan may not be selected, but the selected query plan is deemed better than others based on data available to the query optimizer 260.

The determined optimal query plan can then be sent to the query executor 270 for execution. The query executor 270 can communicate with a data storage 290 and execute operators in the query plan determined by the query optimizer 260. Data retrieved from the data storage 290 can be returned to the tenant 210 via the protocol layer 220.

In some examples, the query optimizer 260 can include a join manager configured to implement efficient join operations, as described more fully below.

The query optimizer 260 can bidirectionally communicate with an in-memory data store 224 configured to store intermediate results of query optimization, such as runtime statistics, hash table, indexes and/or inverted indexes, etc. In some examples, the in-memory data store 224 can also maintain an execution history storing one or more serialized query plans, which can also be referred to as "abstract query plans" or ASPs. The execution history can be used to implement a feature called "plan stability." Plan stability operates by capturing selected ASPs and storing them in the execution history. If performance regression for a query plan occurs, these stored ASPs can be reused to regenerate the original query plans, thereby retaining the original performance. Data stored in the in-memory data store 224 can be persisted to a persistence layer 226. The in-memory data store 224 is a volatile memory, which allows for fast access and manipulation of the data stored therein. The persistence layer 226 can ensure that the ASPs, hash tables, inverted indexes, etc., are retained even when the volatile memory is cleared during a system restart. This allows for the data to be reloaded from the persistence layer 226 back into the in-memory data store 224, e.g., after the system restart.

As described herein, query compilation refers to the process of converting the query 214 to the optimal query plan (e.g., checking syntactic and/or semantic errors, generating the logical tree, and determining optimal query plan), as described above. Depending on the complexity of the query 214 (e.g., the number of joined tables, etc.) and the query optimization algorithm, query compilation time can be long (e.g., tens of seconds or more). Thus, to improve operational efficiency, the compiled query plan (i.e., the determined most optimal query plan) for the query 214 can be stored in the plan cache 222 so that it can be quickly retrieved and reused if the same query is encountered again in the future.

For example, if the cache manager 240 determines that the query 214 has a corresponding query plan stored in the plan cache 222, that query plan can be fetched directly from the plan cache 222 and forwarded to the query executor 270 for execution. Thus, in this scenario, operations by the query parser 250 and query optimizer 260 can be bypassed. In other words, the query 214 does not need to be recompiled because its previously compiled query plan is available in the plan cache 222.

The plan cache 222 is configured to store compiled query plans. For each received query 214, the cache manager 240 checks if it has a compiled query plan stored in the plan cache 222. If yes, then this cached query plan can be reused. This can improve efficiency because it eliminates the time of compiling the query 214 (i.e., regenerating the query plan). On the other hand, if the query 214 has no compiled query plan stored in the plan cache 222, the query 214 has to be compiled. The compiled query plan can then be stored in the plan cache 222 so that when the same query 214 occurs again in the future, fast access to its cached query plan is feasible.

If the received query 214 is new (i.e., a first-time query that has not been encountered before), this new query has no corresponding query plan in the plan cache 222 and it must be compiled for the first time. On the other hand, if the received query 214 is old (i.e., the same query has been encountered at least once before), whether or not there is a corresponding compiled query plan in the plan cache 222 can depend on the size of the plan cache 222 and a plan eviction policy adopted by the cache manager 240.

The plan cache 222 has a limited size. Thus, it may not be able to store all compiled query plans. When the plan cache 222 approaches its full capacity, certain query plans may have to be evicted from the plan cache 222 to make room for new ones according to a predefined plan eviction policy implemented by the cache manager 240. For example, the cache manager 240 can implement a random plan eviction policy which evicts query plans from the plan cache 222 in a random manner. In another example, the cache manager 240 can implement the least recently used (LRU) plan eviction policy which removes the least recently used query plans first from the plan cache 222. In yet another example, the least frequently used (LFU) plan eviction policy can be used which first evicts the execution policies that are used least often. Other plan eviction policies can also be used by the cache manager 240.

In practice, the systems shown herein, such as database management system 200, can vary in complexity, with additional functionality, more complex components, and the like. For example, there can be additional functionality within the query processing engine 230. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The database management system 200 and any of the other systems described herein can be implemented in conjunction with any of the hardware components described herein, such as the computing systems described below (e.g., processing units, memory, and the like). In any of the examples herein, the queries, query plans, indexes, hash tables, dictionaries, and the like can be stored in one or more computer-readable storage media or computer-readable storage devices. The technologies described herein can be generic to the specifics of operating systems or hardware and can be applied in any variety of environments to take advantage of the described features.

Example Join Manager

Figure 3:
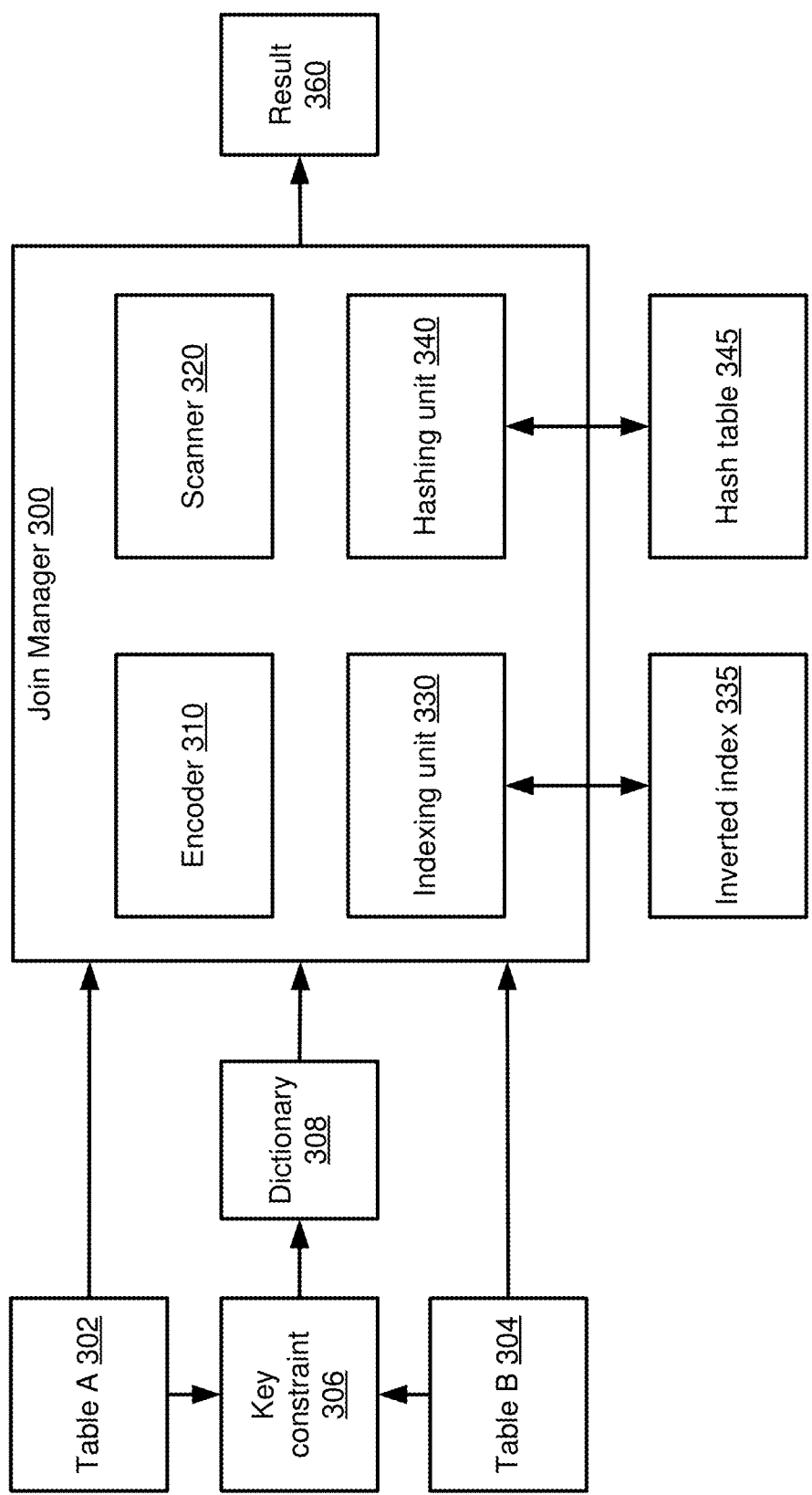
FIG. 3 is a block diagram depicting example components and operations of a join manager implemented in a query optimizer.

FIG. 3 is a block diagram depicting an example join manager 300 configured to implement efficient join operations in conjunction with dictionary encoding. The join manager 300, which can be included in a query optimizer, such as the query optimizer 260 of FIG. 2, can include an encoder 310, a scanner 320, an indexing unit 330, and a hashing unit 340.

The join manager 300 can receive two data tables, table A 302 and table B 304, as input and generates a result 360 by joining table A 302 and table B 304. This is achieved by matching a selected column from table A 302 with a selected column from table B 304. The result 360 includes pairs of record identifiers, each pair including a record identifier (or row number) of table A 302 and a record identifier (or row number) of table B 304, indicating table A 302 and table B 304 have the same data value at the corresponding rows in the selected columns, thereby establishing a successful join operation between the two tables A and B.

As shown, the table A 302 and table B 304 are associated with a key constraint 306, which establishes a predefined primary key and foreign key relationship. In some instances, the selected column in table A 302 is defined as a primary key, and the selected column in table B 304 is defined as a foreign key referencing the primary key of table A 302, or vice versa. In other instances, a selected column in a third table (not shown) can be defined as a primary key. The selected column in table A 302 can be defined as a foreign key referencing the primary key of the third table, and the selected column in table B 304 can also be defined as a foreign key referencing the primary key of the third table. In other words, the join manager 300 is capable of handling complex relationships between multiple tables, where the primary and foreign key associations can span across more than two tables.

The key constraint 306 can be defined in multiple ways, depending on database systems. For example, a primary-foreign key relationship can be defined when creating a table. For instance, the following CREATE statement links a "Prod_Id" foreign key defined in the "SALES" table to a "Prod_Id" primary key defined in the "PRODUCT" table.

```
CREATE column TABLE "SALES"
(
    "Order_code" integer,
    "cust_name" varchar(25),
    "Prod_Id" integer NOT NULL,
    "Prod_Name" varchar(25),
    "Quantity" integer NOT NULL,
    "Sales_Price" integer,
    FOREIGN KEY("Prod_Id") REFERENCES "PRODUCT"
    ("Prod_Id") );
```

As another example, a foreign key constraint can be added to an existing table, e.g., by using an ALTER TABLE statement. For instance, the following ALTER TABLE statement defines a foreign key "Prod_Id" in the "SALES" table, referencing the primary key "Prod_Id" defined in the "PRODUCT" table.

Many other ways of defining the key constraint 306 can be implemented. In some examples, the key constraint 306 can be obtained or retrieved from an ontology or schema of the database.

A dictionary 308 can be created based on a predefined primary key, mapping unique data values contained in the primary key to corresponding unique value identifiers. For example, if the selected column in table A 302 is the primary key and it is linked to the selected column in table B 304 via a primary-foreign key relationship, each unique data value in the selected column of table A 302 can be mapped to a unique value identifier in the dictionary 308. Similarly, if the selected column in the third table is the primary key, and it is linked to both the selected column in table A 302 and the selected column in table B 304 via respective primary-foreign key relationships, then each unique data value in the selected column of the third table can be mapped to a unique value identifier in the dictionary 308.

As described herein, for efficient join operation, the dictionary 308 can be shared by the selected column in table A 302 and the selected column in table B 304, under the key constraint 306. By sharing the dictionary 308, additional data processing steps that would otherwise be required to handle mismatched identifiers defined by two different dictionaries can be avoided.

The encoder 310 is configured to perform dictionary encoding of a selected table column. For example, the encoder 310 can encode the selected column in table A 302 or the selected column in table B 304 to a corresponding data vector using the dictionary 308.

The indexing unit 330 is configured to index a selected table column. For example, the indexing unit 330 can generate an inverted index 335 for the selected column in table A 302 or the selected column in table B 304. This inverted index 335 can be used for index join operation. For instance, if the inverted index 335 is generate from the selected column in table A 302, the scanner 320 can scan or probe the data vector encoded from the selected column of table B 304 (or vice versa) to find rows or records of tables A and B that have common value identifiers (or data values) for the selected columns.

The hashing unit 340 is configured to generate a hash table for a selected table column, e.g., by applying a hash function to data values in the selected table column. Different hashing algorithms can be used to implement the hash function. In some examples, the hashing unit 340 can implement a hash algorithm (e.g., SHA-256 or the like) configured to minimize collisions so as to ensure the uniqueness of the generated hash values. The hashing unit 340 can generate a hash table 345 based on the data vector encoded from the selected column of table A 302 if the number of rows in table A 302 is smaller than the number of rows in table B 304 (that is, table A is smaller than table B), or vice versa. The hash table 345 can be used for hash join operations. For example, the scanner 320 can scan or probe the other data vector encoded from the selected column of the other table B 304 (e.g., assuming table B has more rows or is larger than table A) to identify rows or records of tables A and B that have common hash values (or data values).

Example use cases illustrating efficient index join and hash join in conjunction with dictionary encoding are described further below. Although the column store database is described herein where a table join operation merges rows from two or more tables based on two related columns, it should be understood that the efficient join operations described herein can also be used for the row store database, e.g., by transposing a row store table to a column store table.

Example Overall Method for Efficient Table Join Using Shared Dictionary

Figure 4:
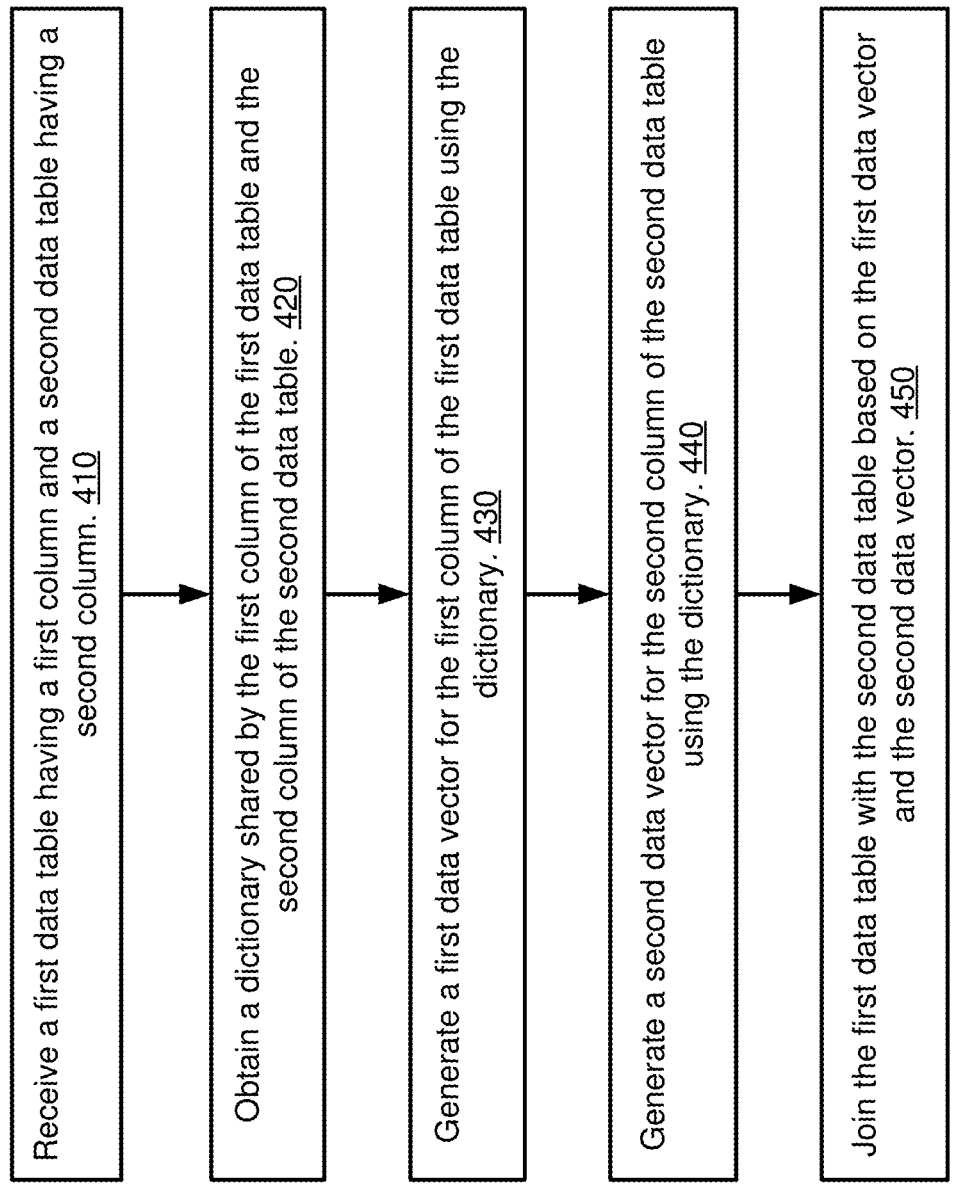
FIG. 4 is a flowchart illustrating an example overall method of implementing efficient join operation using a shared dictionary.

FIG. 4 is a flowchart illustrating an overall method 400 of implementing efficient table join operations, and can be performed, for example, by the join manager 300 of FIG. 3.

At step 410, the method can receive a first data table (e.g., table A 302) having a first column and a second data table (e.g., table B 304) having a second column.

At step 420, the method can obtain a dictionary (e.g., the dictionary 308) shared by the first column of the first data table and the second column of the second data table. The dictionary maps a plurality of unique data values to corresponding unique value identifiers.

The first and second data tables are related to one another by a key constraint (e.g., the key constraint 306). In some examples, the key constraint can be a primary-foreign key relationship directly linking the first and second data tables. For instance, the first data table can define a primary key for the first column which includes the plurality of unique data values defined by the dictionary, and the second data table can define a foreign key for the second column which references the primary key of the first data table. Alternatively, the second data table can define a primary key for the second column which includes the plurality of unique data values defined by the dictionary, and the first data table can define a foreign key for the first column which references the primary key of the second data table.

In some examples, the key constraint can indirectly link the first and second data tables. For instance, a third data table can define a primary key column which includes the plurality of unique data values defined by the dictionary, the first data table can define a foreign key for the first column which references the primary key column of the third data table, and the second data table can define another foreign key for the second column which also references the primary key column of the third data table. In other words, the first and second data tables are indirectly linked through a common reference to the primary key column of the third data table.

At step 430, the method can generate a first data vector for the first column of the first data table, e.g., by encoding, using the dictionary, data values stored in the first column of the first data table to respective first value identifiers. Thus, the resulting first data vector includes first value identifiers defined by the dictionary corresponding to data values stored in the first column of the first data table.

Likewise, at step 440, the method can generate a second data vector for the second column of the second data table, e.g., by encoding, using the dictionary, data values stored in the second column of the second data table to respective second value identifiers. Thus, the second data vector includes second value identifiers defined by the dictionary corresponding to data values stored in the second column of the second data table.

At step 450, the method can join the first data table with the second data table based on the first data vector and the second data vector. The joining can generate one or more matching records between the first data table and the second data table, and such matching records constitute the result of the table join operation (e.g., the result 360). As described herein, a selected matching record includes a first record identifier paired with a second record identifier. The first record identifier identifies a data value stored in the first column of the first data table and the second record identifier identifies the same data value stored in the second column of the second data table.

The method 400, and any other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example Incompatible Dictionaries

Figure 5:
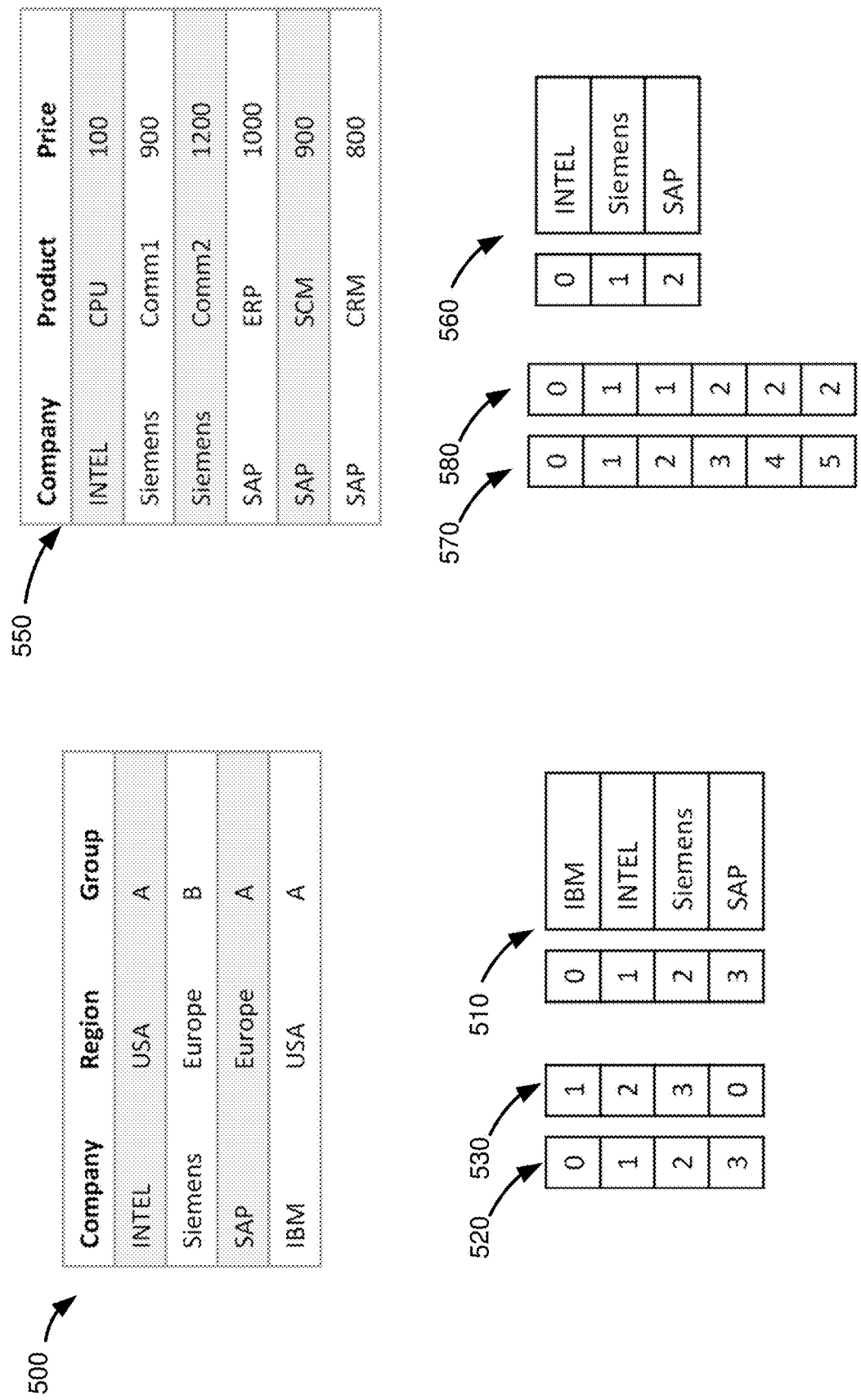
FIG. 5 depicts two example database tables, each having a dictionary associated with a corresponding "company" column, and corresponding dictionary encoded data vectors.
Figure 6:
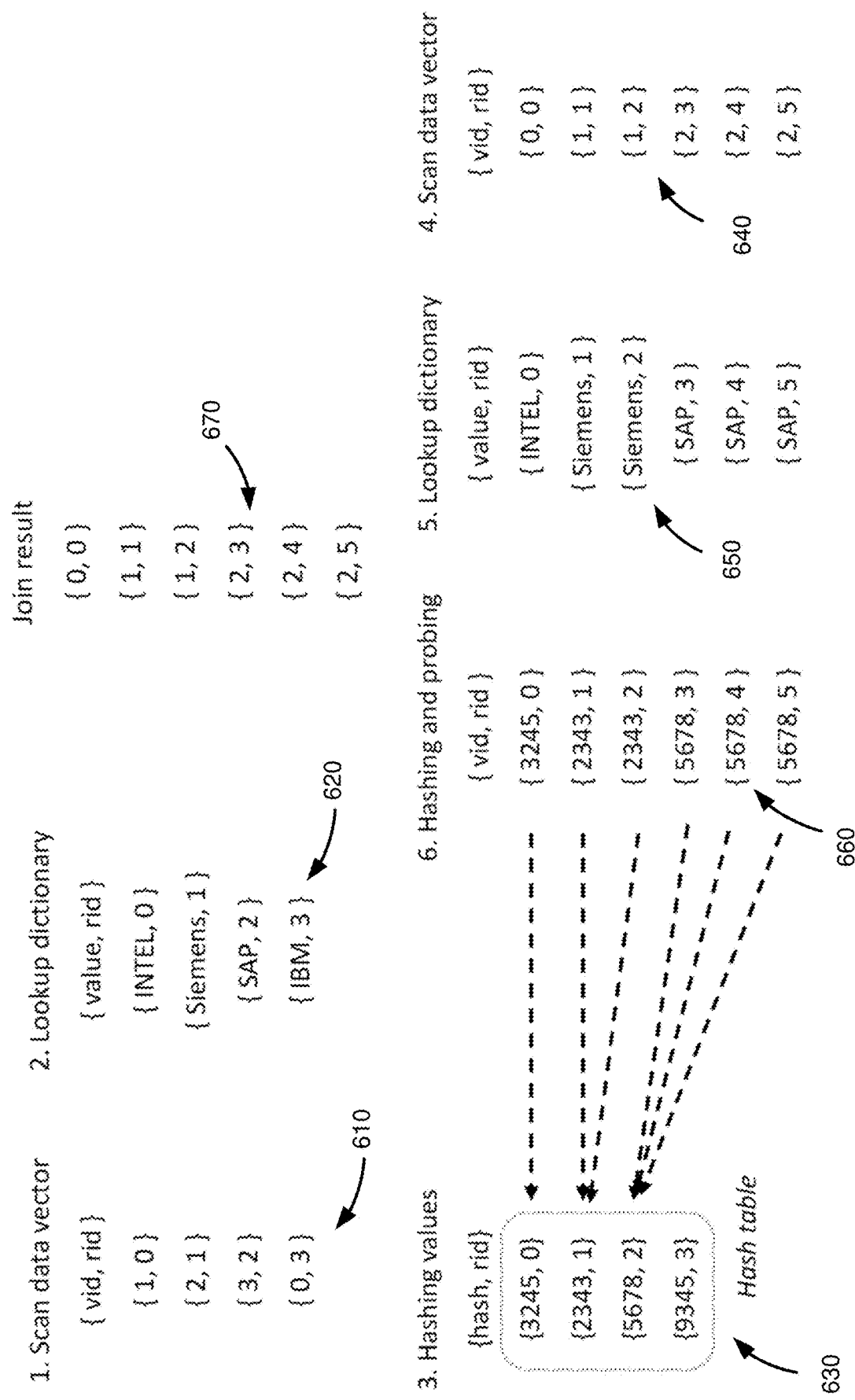
FIG. 6 illustrates steps and intermediate results of performing hash join operation between the two tables depicted in FIG. 5.
Figure 7:
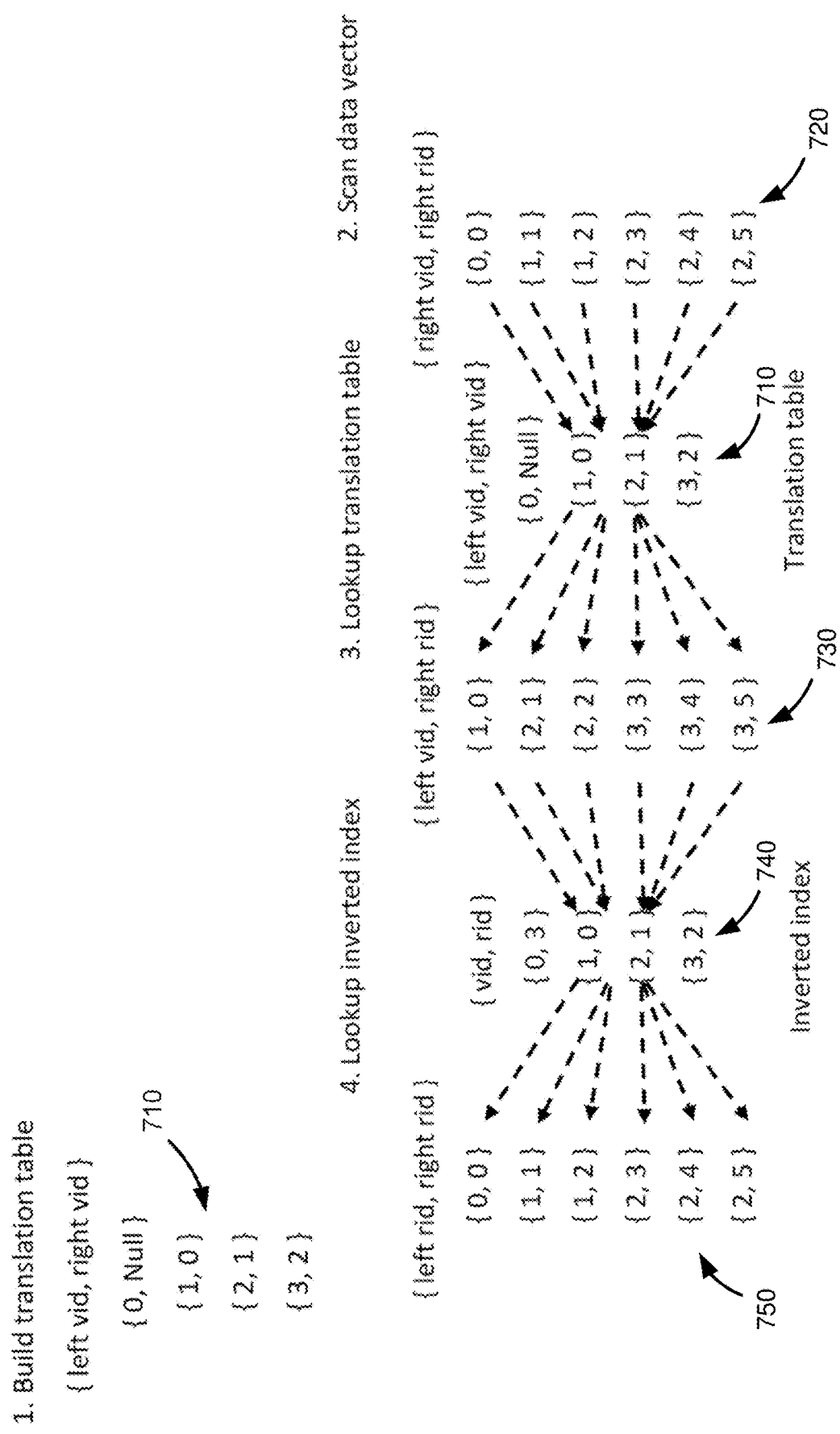
FIG. 7 illustrates steps and intermediate results of performing index join operation between the two tables depicted in FIG. 5.

To illustrate how using a shared dictionary can improve the efficiency of table join operations, FIGS. 5, 6, and 7 show examples of performing table join operations based on two related columns when these two columns are associated with two incompatible dictionaries.

As shown in FIG. 5, a first data table 500 has three columns, including a "Company" column having four unique company names ("INTEL," "Siemens," "SAP," and "IBM"). Assuming the first table 500 defines the "Company" column as the primary key. A first dictionary 510 is created based on the primary key, which maps each unique company name in the primary key to a corresponding unique value identifier (e.g., 0 for "INTEL," 1 for "Siemens," 2 for "SAP," and 3 for "IBM"). Based on the dictionary 510, the data values (strings) in the primary key column can be encoded to a first data vector 530 (e.g., [1, 2, 3, 0]). The first data vector 530 is associated with a first record vector 520, which includes record identifiers or row numbers (e.g., [0, 1, 2, 3])) for corresponding value identifiers included in the first data vector 530.

Also shown in FIG. 5 is a second data table 550 which has three column, including a "Product" column defined as a primary key of the second data table 550, and a "Company" column defined as a foreign key referencing the primary key ("Company" column) of the first data table 500. Note that in this example, the company names in the foreign key column can have duplicates (e.g., two records associated with "Siemens" and three records associated with "SAP"), and may not include all company names listed in the primary key of data table 500 (e.g., no "IBM" appears in the "Company" column of data table 550). In the depicted example, a second dictionary 560 is created based on the "Company" column (foreign key) of the second data table 550, which maps each unique company name in the foreign key to a corresponding unique value identifier (e.g., 9 for "INTEL," 1 for "Siemens," and 2 for "SAP"). Based on the dictionary 560, the data values (strings) in the foreign key column can be encoded to a second data vector 580 (e.g., [0, 1, 1, 2, 2, 2]). Similarly, the second data vector 530 is associated with a second record vector 570, which includes record identifiers or row numbers (e.g., [0, 1, 2, 3, 4, 5])) for corresponding value identifiers included in the second data vector 580.

As shown in this example, the first dictionary 510 is incompatible with the second dictionary 560. For example, while the "INTEL," "Siemens," and "SAP" are respectively mapped to value identifiers 1, 2, and 3 in the first dictionary 510, the same data values or strings are respectively mapped to different value identifiers 0, 1, and 2 in the second dictionary 560. Additionally, while the first dictionary 510 maps "IBM" to the value identifier 0, the second dictionary 560 does not define "IBM."

Example Hash Join Operation Using Incompatible Dictionaries

FIG. 6 illustrates steps and intermediate results of performing hash join operation between the first table 500 and second table 550 based on the related columns "Company" when the two incompatible dictionaries 510 and 560 are used, as is typical in conventional database systems.

To perform the hash join, a hash table needs to be created based on a smaller table, e.g., the first table 500 in this example (because the first table 500 has four data records whereas the second table 550 has six data records). To create the hash table, a hash function can be applied to data values or strings in the "Company" column of the first table 500. When the "Company" column of the first table 500 is dictionary encoded, the encoded first data vector 530 needs to be first decoded using the first dictionary 510. In the depicted example, both the first data vector 530 (including each value identifier, or 'vid') and the corresponding first record vector 520 (including each record identifier, or 'rid') are shown together as a vector pair 610. As shown, the hash join operation can start with scanning the first data vector 530 (step 1) and converting/decoding each vid in the first data vector 530 to its original data value (e.g., strings) by looking up the first dictionary 510 (step 2). The converted/decoded data values, along with the first record vector 520, are shown as string-rid pairs 620. Then, a hashing function can transform the converted/decoded data values (strings) into corresponding hash values (step 3). The generated hash values, along with the first record vector 520, can constitute a hash table 630, which can be saved in a memory space (e.g., the in-memory data store 224).

Then, the larger table (e.g., the second table 550) can be probed or scanned to find matching records based on the two related "Company" columns. Since the "Company" column of the second table 550 is also dictionary encoded, the encoded second data vector 580 needs to be decoded using the second dictionary 560. In FIG. 6, both the second data vector 580 (including each vid) and the corresponding second record vector 570 (including each rid) are shown together as another vector pair 640. Likewise, the second data vector 580 can be scanned (step 4) to convert/decode each vid in the second data vector 580 to its original data value (e.g., strings) by looking up the second dictionary 560 (step 5). The converted/decoded data values, along with the second record vector 570, are shown as string-rid pairs 650. Then, the same hashing function can transform the converted/decoded data values (strings) into corresponding hash values (step 6), as indicated by the hash value-rid pairs 660.

Finally, the hash table 630 can be looked up to determine if any of the hash values generated for the "Company" column of the second table 550 have matching hash values stored in the hash table 630. For each found match, the corresponding rid in the first record vector 520 (and stored in the hash table 630) can be paired with a corresponding rid in the second record vector 570, thereby forming one matching record. For example, FIG. 6 shows that the result of hash join includes a total of six matching records 670 (e.g., {0, 0}, {1, 1}, {1, 2}, {2, 3}, {2, 4}, and {2, 5}), each including a pair of record identifiers indicating row numbers of the first table 500 and second table 550, respectively.

Example Index Join Operation Using Incompatible Dictionaries

FIG. 7 illustrates steps and intermediate results of performing index join operation between the first table 500 and second table 550 based on the related columns "Company" when the two incompatible dictionaries 510 and 560 are used, as is typical in conventional database systems. In the depicted example, "left" denotes vid or rid related to the first table 500, and "right" denotes vid or rid related to the second table 550.

First, a translation table 710 needs to be built (step 1) so that the two incompatible dictionaries 510 and 560 can be reconciled. The translation table 710 maps the unique value identifiers from each dictionary to one another, accounting for any discrepancies between them. Specifically, the translation table 710 includes entries for each unique value identifier from both dictionaries. Each entry includes a pair of value identifiers, one from each dictionary. If a unique data value appears in one dictionary but not the other, NULL is used as the value identifier for the missing entry. For instance, the translation table 710 in this example includes four entries: {0, NULL}, {1, 0}, {2, 1}, {3, 2}. The first entry {0, NULL} indicates that "IBM" is mapped to the value identifier 0 in the first dictionary 510, but does not appear in the second dictionary 560. The second entry {1, 0} shows that "INTEL" is mapped to 1 in the first dictionary 510 and 0 in the second dictionary 560, and so on.

For index join, an inverted index can be created based on one table (e.g., a smaller table). Then, the other table (e.g., the larger table) can be scanned or probed using the inverted index to find matching records in the related columns.

In the depicted example, an inverted index 740 is created for the "Company" column of the first table 500. The inverted index 740 includes four entries: {0, 3}, {1, 0}, {2, 1}, and {3, 2}. Each entry maps a unique value identifier defined in the first dictionary 510 to a corresponding record identifier of the first table 500. Note that in some examples, one unique value identifier can be mapped to multiple record identifiers, as illustrated by the inverse index 140 of FIG. 1.

In the depicted example, both the second data vector 580 (including each vid) and the corresponding second record vector 570 (including each rid) are shown together as a vector pair 720. As shown, the second data vector 580 is scanned (step 2) to convert each vid in the second data vector 580 to a translated vid by looking up the translation table (step 3). The result of such translation is a translated vector pair 730 which includes unique value identifiers defined in the first dictionary 510. For example, for the six data records (rid from 0 to 5) of the second table 550, the corresponding value identifiers are translated from 0, 1, 1, 2, 2, and 2 (defined by the second dictionary 560) to 1, 2, 2, 3, 3, and 3 (defined by the first dictionary 510), respectively.

Then, each translated vid in the vector pair 730 can be looked up in inverted index 740 (step 4) to find matching records 750. Similarly, each matching record includes a pair of rid in the first record vector 520 and a corresponding rid in the second record vector 570. For example, for the first translated vid=1 associated with rid=0 in the second record vector, a match is found in the inverted index 740 with associated rid=0 in the first record vector. Thus, a matching record {0, 0} is generated. Note that the matching records 750 are identical to the matching records 670 of FIG. 6 because they both represent results of table join (although they use different join methods).

Example Shared Dictionary Based on Key Constraint

As described herein, for more efficient join operation of two tables related to one another with a key constraint, a shared dictionary can be used so that any dictionary incompatibility issues can be avoided.

Specifically, if a first table defines a primary key and a second table defines a foreign key referencing the primary key of the first table, then a dictionary created based on the primary key of the first table can be shared with the foreign key of the second table. For example, in the example depicted in FIG. 5, the first dictionary 510 is created based on the primary key ("Company" column) of the first table 500, and it is used to encode the "Company" column into the first data vector 530. The same dictionary 510 can be shared with the foreign key ("Company" column) of the second table 550. In other words, instead of encoding the "Company" column of the second table 550 using the second dictionary 560 (which is incompatible with the first dictionary 510), that column can be encoded using the same dictionary 510.

As described above, a key constraint can link two tables indirectly. For example, a first table and a second table can each define a foreign key which is linked to a primary key of a third table. In that case, a dictionary created based on the primary key of the third table can be shared with the foreign key of the first table and the foreign key of the second table. In other words, the same dictionary can be used to encode both foreign key columns of the first and second tables.

In either case, because the dictionary is created based on a primary key defined in a table, it maps all possible unique data values in the primary key to corresponding unique data identifiers. Because data values in the foreign key of another table (linked to this primary key) can only be those listed in the primary key (e.g., a subset), they can be encoded to corresponding unique data identifiers using the same dictionary.

Example Hash Join and Index Join Based on Shared Dictionary

Using a shared dictionary based on a key constraint, the efficiency of table join operation can be greatly improved compared to using two incompatible dictionaries, as illustrated in FIGS. 8A-8D.

Figure 8B:
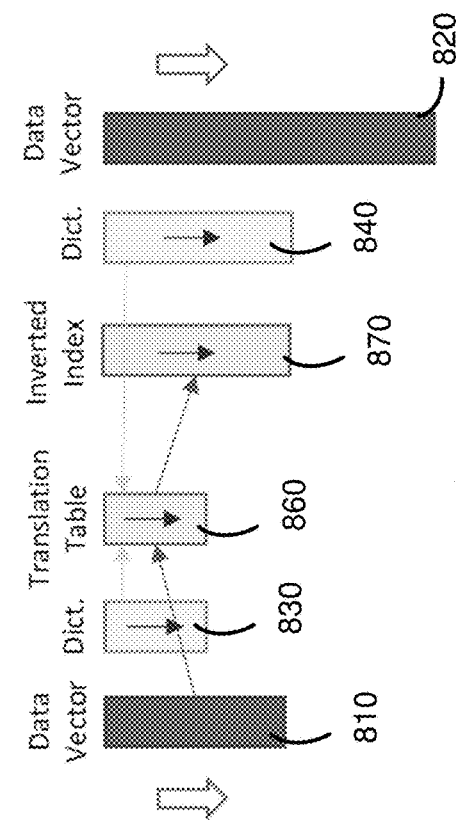
FIG. 8B schematically depicts objects involved in conventional index join operation.
Figure 8D:
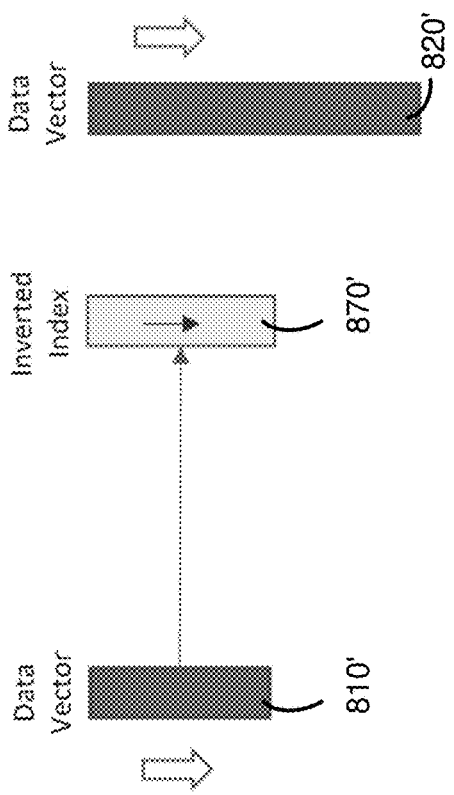
FIG. 8D schematically depicts objects involved in efficient index join operation using a shared dictionary.
Figure 8A:
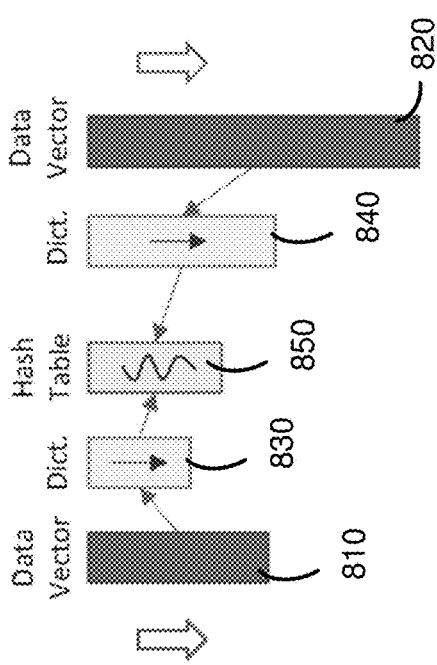
FIG. 8A schematically depicts objects involved in conventional hash join operation.

FIG. 8A schematically illustrates conventional hash join of two tables based on two related columns: a first column (of a first table) is encoded in a first data vector 810 using a first dictionary 830, and a second column (of a second table) is encoded in a second data vector 820 using a second dictionary 840. To perform hash join, a hash table 850 is created based on the first column, and this hash table 850 is then used to probe the second column, assuming the first table is smaller than the second table. Value identifiers in the data vectors 810 and 820 cannot be directly used to generate hash values for comparison purposes because value identifiers encoded using incompatible dictionaries 830, 840 are not meaningfully comparable. Instead, the hashing function must be applied to original data values in the first or second columns. Thus, the first data vector 810 needs to be decoded (to obtain original data values in the first column) using the first dictionary 830, and the second data vector 820 needs to be decoded (to obtain original data values in the second column) using the second dictionary 840. The hash table 850 is created by applying a hashing function to the data values decoded from the first data vector 810. Hash values can be generated by applying the same hashing function to data values decoded from the second data vector 820, and the hash table 850 can be looked up to determine if the generated hash values have matching record(s) in the hash table 850.

Figure 8C:
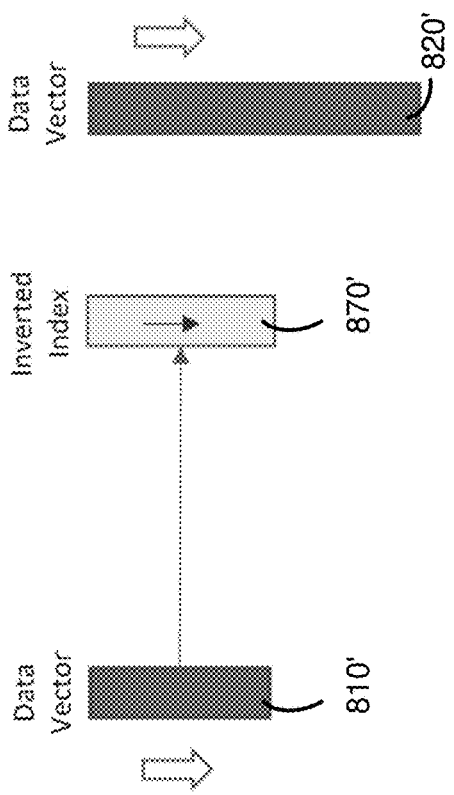
FIG. 8C schematically depicts objects involved in efficient hash join operation using a shared dictionary.

In contrast, the efficiency of hash join operation can be improved by using a shared dictionary, as schematically illustrated in FIG. 8C. Here, the first column (of the first table) and the second column (of the second table) can be respectively encoded into a first data vector 810' and a second data vector 820' by using a shared dictionary. The shared dictionary ensures that value identifiers in the data vectors 810' and 820' can be meaningfully compared. Thus, the data vectors 810' and 820' can be directly hashed and compared. For example, a hash table 850' can be created by applying a hashing function to the value identifiers in the first data vector 810'. Hash values can be generated by applying the same hashing function to value identifiers in the second data vector 820', and the generated hash values can be compared against the hash table 850' to find matching record(s), if any. Thus, compared to conventional hash join depicted in FIG. 8A, the use of a shared dictionary eliminates the need of two decoding steps (e.g., steps 2 and 5 of FIG. 6, "lookup dictionary") involving two different dictionaries 830, 840, as illustrated in FIG. 8C.

FIG. 8B schematically illustrates conventional index join of two tables based on two related columns. To perform index join, a translation table 860 must be built to create a mapping between value identifiers defined by the first dictionary 830 and value identifiers defined by the second dictionary 840. As shown, an inverted index 870 is created based on the first data vector 810 encoded from the first column. Thus, the inverted index 870 includes value identifiers defined by the first dictionary 830. To perform index join, the second data vector 820 encoded from the second column must be first translated using the translation table 860 so that the translated value identifiers are also defined by the first dictionary 830, instead of the second dictionary 840. Then, the inverted index 870 is looked up when scanning the translated second data vector to find matching record(s), if any.

As schematically depicted in FIG. 8D, the efficiency of index join operation can be improved by using a shared dictionary. Like FIG. 8C, the two related columns are respectively encoded into two data vector 810', 820' using the shared dictionary. Because the value identifiers in the data vectors 810' and 820' can be directly compared, there is no need to create the translation table 860 and use it to translate one of the data vectors. Instead, an inverted index 870' can be created directly based on the first data vector 810', and the second data vector 820' can be scanned to find matching record(s), if any, by looking up this inverted index 870'. Thus, compared to conventional index join depicted in FIG. 8B, the use of a shared dictionary can eliminate the step of building a translation table (e.g., step 1 of FIG. 7) and looking up the translation table (e.g., step 3 of FIG. 7), as illustrated in FIG. 8D.

Example Advantages

The technologies described herein offer several technical advantages in the field of database management, particularly in the context of join operations in column store relational databases. The use of a shared dictionary based on a key constraint greatly enhances the efficiency of table join operations compared to the conventional approach of using two incompatible dictionaries. This is primarily due to the fact that the shared dictionary ensures that value identifiers in the data vectors can be meaningfully compared, thereby eliminating the need for additional data processing steps to handle mismatched identifiers.

More specifically, for hash join operations, the shared dictionary allows for direct hashing and comparison of the dictionary-encoded data vectors. This eliminates the need for separate decoding steps involving two different dictionaries, which are required in the conventional approach. Similarly, for index join operations, an inverted index can be created directly from one dictionary-encoded data vector and used for probing another dictionary-encoded data vector. Thus, the use of a shared dictionary eliminates the need to create a translation table and use it to translate one of the data vectors. The elimination of those additional data processing steps not only reduces the computational cost (e.g., in terms of CPU usage) and memory consumption (e.g., for two related columns, there is no need to keep two separate dictionaries and/or a translation table), but also improves the overall performance of the database queries (e.g., reduce query execution time).

Besides improving the efficiency of join operations, the use of a shared dictionary also simplifies the process of inserting new values into the database. For example, in the case of separate dictionaries, to add a new value into a foreign key column, there is a need to look up the dictionary of the primary key column to check the existence of the new value and if it exists, the new value is inserted into the dictionary of the foreign key column. This insertion step (for updating the dictionary of the foreign key column) can be time-consuming, especially for large databases. However, with a shared dictionary, the process is much more streamlined because there is only a need to look up the shared dictionary and there is no need to insert the new value into another dictionary.

In sum, the disclosed technology not only provides a more efficient and streamlined approach to performing join operations in column store relational databases, but also simplifies the process of inserting new values into the database, thereby leading to improved query performance and reduced computational cost.

Example Computing Systems

Figure 9:
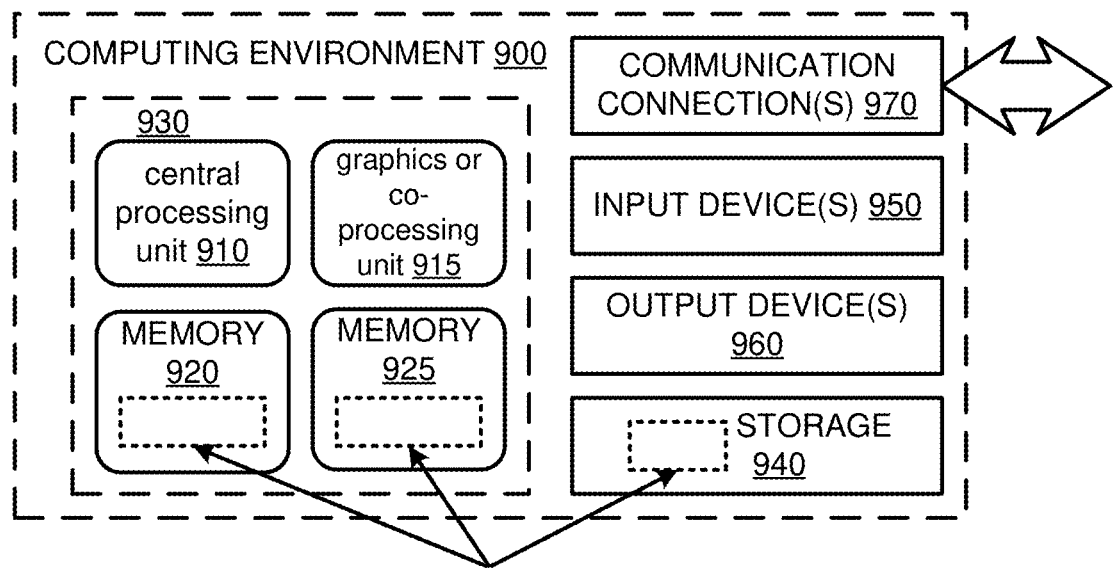
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 can execute computer-executable instructions, such as for implementing the features described in the examples herein (e.g., the method 400). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), non-volatile memory (e.g., ROM, EEPROM, flash memory, etc.), or some combination of the two, accessible by the processing unit(s) 910, 915. The memory 920, 925 can store software 980 implementing one or more innovations described herein, in the form of computer-executable instructions suitable for execution by the processing unit(s) 910, 915.

A computing system 900 can have additional features. For example, the computing system 900 can include storage 940, one or more input devices 950, one or more output devices 960, and one or more communication connections 970, including input devices, output devices, and communication connections for interacting with a user. An interconnection mechanism (not shown) such as a bus, controller, or network can interconnect the components of the computing system 900. Typically, operating system software (not shown) can provide an operating environment for other software executing in the computing system 900, and coordinate activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 can store instructions for the software implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 10:
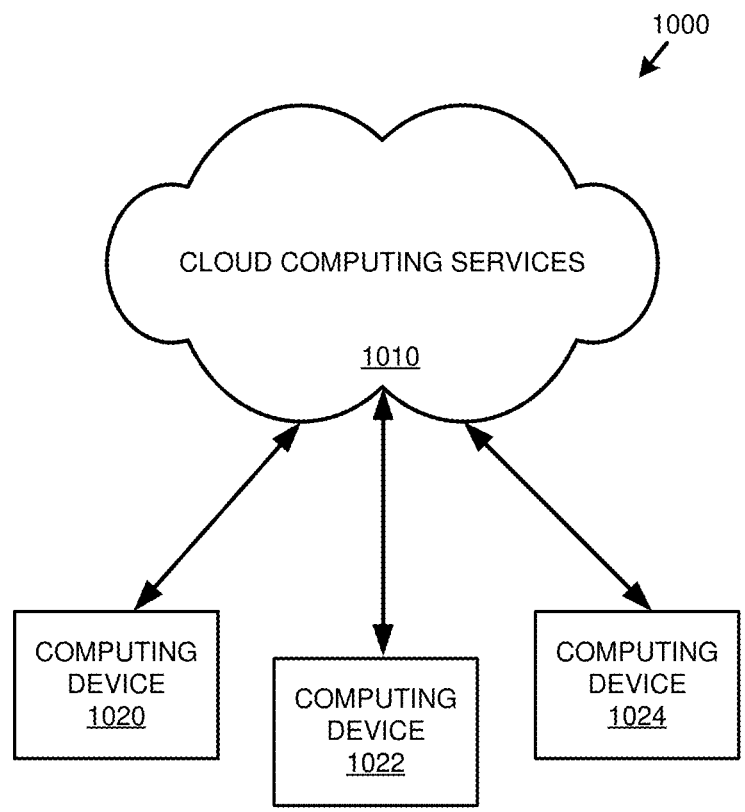
FIG. 10 is a block diagram of an example cloud computing environment that can be used in conjunction with the technologies described herein.

FIG. 10 depicts an example cloud computing environment 1000 in which the described technologies can be implemented, including, e.g., the system 200 and other systems herein. The cloud computing environment 1000 can include cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 can be utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example Clauses

Any of the following example clauses can be implemented.

Clause 1. A computer-implemented method, comprising: receiving a first data table having a first column and a second data table having a second column; obtaining a dictionary shared by the first column of the first data table and the second column of the second data table, wherein the dictionary maps a plurality of unique data values to corresponding unique value identifiers; generating a first data vector for the first column of the first data table, wherein the first data vector comprises first value identifiers defined by the dictionary corresponding to data values stored in the first column of the first data table; generating a second data vector for the second column of the second data table, wherein the second data vector comprises second value identifiers defined by the dictionary corresponding to data values stored in the second column of the second data table; and joining the first data table with the second data table based on the first data vector and the second data vector, wherein the joining generates one or more matching records between the first data table and the second data table, wherein a selected matching record comprises a first record identifier paired with a second record identifier, wherein the first record identifier identifies a data value stored in the first column of the first data table and the second record identifier identifies the same data value stored in the second column of the second data table.

Clause 2. The method of clause 1, wherein the first data table defines a primary key for the first column which includes the plurality of unique data values defined by the dictionary, wherein the second data table defines a foreign key for the second column which references the primary key of the first data table.

Clause 3. The method of clause 1, wherein a third data table defines a primary key column which includes the plurality of unique data values defined by the dictionary, wherein the first data table defines a foreign key for the first column which references the primary key column of the third data table, wherein the second data table defines another foreign key for the second column which also references the primary key column of the third data table.

Clause 4. The method of any one of clauses 1-3, wherein generating the first data vector comprises encoding the data values stored in the first column of the first data table to respective first value identifiers using the dictionary, wherein generating the second data vector comprises encoding the data values stored in the second column of the second data table to respective second value identifiers using the dictionary.

Clause 5. The method of any one of clauses 1-4, wherein joining the first data table with the second data table comprises creating a hash table using the first data vector and probing the second data vector using the hash table.

Clause 6. The method of clause 5, wherein creating the hash table comprises applying a hash function to convert the first value identifiers to respective hash values, wherein probing the second data vector comprises identifying if one or more of the second value identifiers match any of the hash values.

Clause 7. The method of any one of clauses 5-6, wherein a dimension of the first data vector is smaller than or equal to a dimension of the second data vector.

Clause 8. The method of any one of clauses 1-4, wherein joining the first data table with the second data table comprises creating an inverted index using the first data vector and probing the second data vector using the inverted index.

Clause 9. The method of clause 8, wherein creating the inverted index comprises mapping the first value identifiers in the first data vector to corresponding first record identifiers.

Clause 10. The method of clause 9, wherein probing the second data vector comprises looking up the inverted index to find a subset of the first value identifiers that match at least some of the second value identifiers in the second data vector.

Clause 11. A computing system, comprising: memory; one or more hardware processors coupled to the memory; and one or more non-transitory computer-readable media storing instructions that, when loaded into the memory, cause the one or more hardware processors to perform operations comprising: receiving a first data table having a first column and a second data table having a second column; obtaining a dictionary shared by the first column of the first data table and the second column of the second data table, wherein the dictionary maps a plurality of unique data values to corresponding unique value identifiers; generating a first data vector for the first column of the first data table, wherein the first data vector comprises first value identifiers defined by the dictionary corresponding to data values stored in the first column of the first data table; generating a second data vector for the second column of the second data table, wherein the second data vector comprises second value identifiers defined by the dictionary corresponding to data values stored in the second column of the second data table; and joining the first data table with the second data table based on the first data vector and the second data vector, wherein the joining generates one or more matching records between the first data table and the second data table, wherein a selected matching record comprises a first record identifier paired with a second record identifier, wherein the first record identifier identifies a data value stored in the first column of the first data table and the second record identifier identifies the same data value stored in the second column of the second data table.

Clause 12. The system of clause 11, wherein the first data table defines a primary key for the first column which includes the plurality of unique data values defined by the dictionary, wherein the second data table defines a foreign key for the second column which references the primary key of the first data table.

Clause 13. The system of clause 11, wherein a third data table defines a primary key column which includes the plurality of unique data values defined by the dictionary, wherein the first data table defines a foreign key for the first column which references the primary key column of the third data table, wherein the second data table defines another foreign key for the second column which also references the primary key column of the third data table.

Clause 14. The system of any one of clauses 11-13, wherein generating the first data vector comprises encoding the data values stored in the first column of the first data table to respective first value identifiers using the dictionary, wherein generating the second data vector comprises encoding the data values stored in the second column of the second data table to respective second value identifiers using the dictionary.

Clause 15. The system of any one of clauses 11-14, wherein joining the first data table with the second data table comprises creating a hash table using the first data vector and probing the second data vector using the hash table.

Clause 16. The system of clause 15, wherein creating the hash table comprises applying a hash function to convert the first value identifiers to respective hash values, wherein probing the second data vector comprises identifying if one or more of the second value identifiers match any of the hash values.

Clause 17. The system of any one of clauses 11-14, wherein joining the first data table with the second data table comprises creating an inverted index using the first data vector and probing the second data vector using the inverted index.

Clause 18. The system of clause 17, wherein creating the inverted index comprises mapping the first value identifiers in the first data vector to corresponding first record identifiers.

Clause 19. The system of clause 18, wherein probing the second data vector comprises looking up the inverted index to find a subset of the first value identifiers that match at least some of the second value identifiers in the second data vector.

Clause 20. One or more non-transitory computer-readable media having encoded thereon computer-executable instructions causing one or more processors to perform a method comprising: receiving a first data table having a first column and a second data table having a second column; obtaining a dictionary shared by the first column of the first data table and the second column of the second data table, wherein the dictionary maps a plurality of unique data values to corresponding unique value identifiers; generating a first data vector for the first column of the first data table, wherein the first data vector comprises first value identifiers defined by the dictionary corresponding to data values stored in the first column of the first data table; generating a second data vector for the second column of the second data table, wherein the second data vector comprises second value identifiers defined by the dictionary corresponding to data values stored in the second column of the second data table; and joining the first data table with the second data table based on the first data vector and the second data vector, wherein the joining generates one or more matching records between the first data table and the second data table, wherein a selected matching record comprises a first record identifier paired with a second record identifier, wherein the first record identifier identifies a data value stored in the first column of the first data table and the second record identifier identifies the same data value stored in the second column of the second data table.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for performing a table join during runtime query optimization, comprising:
    receiving, during execution of a database query, a first data table having a first column and a second data table having a second column;
    identifying a key constraint that defines a primary-foreign key relationship between the first column and the second column, wherein the first data table defines a primary key for the first column which includes a plurality of unique data values, and the second data table defines a foreign key for the second column which references the primary key of the first data table;
    creating, responsive to identifying the key constraint, a dictionary that maps the plurality of unique data values in the first column to corresponding unique value identifiers, the dictionary being shared by the first column of the first data table and the second column of the second data table;
    encoding data values stored in the first column of the first data table into a first data vector comprising encoded first value identifiers defined by the dictionary;
    encoding data values stored in the second column of the second data table into a second data vector comprising encoded second value identifiers defined by the dictionary; and
    joining, by a query processing engine during runtime query optimization, the first data table with the second data table based on matches between the encoded first value identifiers in the first data vector and the encoded second value identifiers in the second data vector, wherein the joining generates one or more matching records between the first data table and the second data table, wherein a selected matching record comprises a first record identifier paired with a second record identifier, wherein the first record identifier identifies a data value stored in the first column of the first data table based on the dictionary being shared by the first column of the first data table and the second column of the second data table, wherein the second record identifier identifies the same data value stored in the second column of the second data table based on the dictionary being shared by the first column of the first data table and the second column of the second data table, wherein the joining is performed without decoding the encoded first value identifiers or the encoded second value identifiers into corresponding data values.

2. The method of claim 1, wherein a third data table defines a primary key column which includes the plurality of unique data values defined by the dictionary, wherein the first data table defines a foreign key for the first column which references the primary key column of the third data table, wherein the second data table defines another foreign key for the second column which also references the primary key column of the third data table.

3. The method of claim 1, wherein joining the first data table with the second data table comprises creating a hash table using the first data vector and probing the second data vector using the hash table.

4. The method of claim 3, wherein creating the hash table and probing the second data vector comprises applying a hash function to convert the encoded first value identifiers to respective first hash values, wherein probing the second data vector comprises applying the hash function to the encoded second value identifiers to respective second hash values, and identifying if one or more of the second hash values match any of the first hash values.

5. The method of claim 3, wherein a dimension of the first data vector is smaller than or equal to a dimension of the second data vector.

6. The method of claim 1, wherein joining the first data table with the second data table comprises creating an inverted index using the first data vector and probing the second data vector using the inverted index.

7. The method of claim 6, wherein creating the inverted index comprises mapping the encoded first value identifiers in the first data vector to corresponding first record identifiers.

8. The method of claim 7, wherein probing the second data vector comprises looking up the inverted index to find a subset of the encoded first value identifiers that match at least some of the encoded second value identifiers in the second data vector.

9. A computing system for performing a table join during runtime query optimization, the system comprising:
  memory;
  one or more hardware processors coupled to the memory; and
  one or more non-transitory computer-readable media storing instructions that, when loaded into the memory, cause the one or more hardware processors to perform operations comprising:
    receiving, during execution of a database query, a first data table having a first column and a second data table having a second column;
    identifying a key constraint that defines a primary-foreign key relationship between the first column and the second column, wherein the first data table defines a primary key for the first column which includes a plurality of unique data values, and the second data table defines a foreign key for the second column which references the primary key of the first data table;
    creating, responsive to identifying the key constraint, a dictionary that maps the plurality of unique data values in the first column to corresponding unique value identifiers, the dictionary being shared by the first column of the first data table and the second column of the second data table;
    encoding data values stored in the first column of the first data table into a first data vector comprising encoded first value identifiers defined by the dictionary;
    encoding data values stored in the second column of the second data table into a second data vector comprising encoded second value identifiers defined by the dictionary; and
    joining, a query processing engine during runtime query optimization, the first data table with the second data table based on matches between the encoded first value identifiers in the first data vector and the encoded second value identifiers in the second data vector, wherein the joining generates one or more matching records between the first data table and the second data table, wherein a selected matching record comprises a first record identifier paired with a second record identifier, wherein the first record identifier identifies a data value stored in the first column of the first data table based on the dictionary being shared by the first column of the first data table and the second column of the second data table, wherein the second record identifier identifies the same data value stored in the second column of the second data table based on the dictionary being shared by the first column of the first data table and the second column of the second data table, wherein the joining is performed without decoding the encoded first value identifiers or the encoded second value identifiers into corresponding data values.

10. The system of claim 9, wherein a third data table defines a primary key column which includes the plurality of unique data values defined by the dictionary, wherein the first data table defines a foreign key for the first column which references the primary key column of the third data table, wherein the second data table defines another foreign key for the second column which also references the primary key column of the third data table.

11. The system of claim 9, wherein joining the first data table with the second data table comprises creating a hash table using the first data vector and probing the second data vector using the hash table.

12. The system of claim 11, wherein creating the hash table and probing the second data vector comprises applying a hash function to convert the encoded first value identifiers to respective first hash values, wherein probing the second data vector comprises applying the hash function to the encoded second value identifiers to respective second hash values, and identifying if one or more of the second hash values match any of the first hash values.

13. The system of claim 9, wherein joining the first data table with the second data table comprises creating an inverted index using the first data vector and probing the second data vector using the inverted index.

14. The system of claim 13, wherein creating the inverted index comprises mapping the encoded first value identifiers in the first data vector to corresponding first record identifiers.

15. The system of claim 14, wherein probing the second data vector comprises looking up the inverted index to find a subset of the encoded first value identifiers that match at least some of the encoded second value identifiers in the second data vector.

16. One or more non-transitory computer-readable media having encoded thereon computer-executable instructions causing one or more processors to perform a method for performing a table join during runtime query optimization, the method comprising:

receiving, during execution of a database query, a first data table having a first column and a second data table having a second column;

identifying a key constraint that defines a primary-foreign key relationship between the first column and the second column, wherein the first data table defines a primary key for the first column which includes a plurality of unique data values, and the second data table defines a foreign key for the second column which references the primary key of the first data table;

creating, responsive to identifying the key constraint, a dictionary that maps the plurality of unique data values in the first column to corresponding unique value identifiers, the dictionary being shared by the first column of the first data table and the second column of the second data table;

encoding data values stored in the first column of the first data table into a first data vector comprising encoded first value identifiers defined by the dictionary;

encoding data values stored in the second column of the second data table into a second data vector comprising encoded second value identifiers defined by the dictionary; and joining, by a query processing engine during runtime query optimization, the first data table with the second data table based on matches between the encoded first value identifiers in the first data vector and the encoded second value identifiers in the second data vector, wherein the joining generates one or more matching records between the first data table and the second data table, wherein a selected matching record comprises a first record identifier paired with a second record identifier, wherein the first record identifier identifies a data value stored in the first column of the first data table based on the dictionary being shared by the first column of the first data table and the second column of the second data table, wherein the second record identifier identifies the same data value stored in the second column of the second data table based on the dictionary being shared by the first column of the first data table and the second column of the second data table, wherein the joining is performed without decoding the encoded first value identifiers or the encoded second value identifiers into corresponding data values.

* * * * *